(12) United States Patent
Rahm et al.

(10) Patent No.: US 12,347,590 B2
(45) Date of Patent: Jul. 1, 2025

(54) AIR-COOLED RESISTOR ARRANGEMENT

(71) Applicant: Volvo Truck Corporation, Gothenburg (SE)

(72) Inventors: Fredrik Rahm, Hörby (SE); Peter Tennevall, Malmö (SE); Magnus Ising, Lund (SE); Tove Audhav, Landvetter (SE); Arne Andersson, Mölnlycke (SE)

(73) Assignee: Volvo Truck Corporation, Gothenburg (SE)

( * ) Notice: Subject to any disclaimer, the term of this patent is extended or adjusted under 35 U.S.C. 154(b) by 349 days.

(21) Appl. No.: 18/119,362

(22) Filed: Mar. 9, 2023

(65) Prior Publication Data
US 2023/0298785 A1 Sep. 21, 2023

(30) Foreign Application Priority Data
Mar. 21, 2022 (EP) .................................... 22163272

(51) Int. Cl.
*H01C 1/082* (2006.01)
*B60L 7/22* (2006.01)

(52) U.S. Cl.
CPC ............... *H01C 1/082* (2013.01); *B60L 7/22* (2013.01)

(58) Field of Classification Search
CPC .................................. H01C 1/082; B60L 7/22
See application file for complete search history.

(56) References Cited

U.S. PATENT DOCUMENTS 2,412,462 A 4/1944 Marsten
2005/0082035 A1* 4/2005 Debashisu ............ H01L 23/467

FOREIGN PATENT DOCUMENTS

| CN | 107045909 | * | 8/2017 | ............... H01C 1/08 |
| DE | 202009005664 | * | 7/2009 | ............ H01C 1/082 |
| JP | S5720407 A | | 2/1982 | |
| JP | H04096648 A | | 3/1992 | |
| JP | 2018149882 A | | 9/2018 | |

OTHER PUBLICATIONS

DE-202009005664 translation (Year: 2009).*
CN-107045909 translation (Year: 2017).*
Extended European Search Report for European Patent Application No. 22163272.2, mailed Sep. 21, 2022, 5 pages.

* cited by examiner

Primary Examiner — Kyung S Lee
(74) Attorney, Agent, or Firm — Withrow & Terranova, PLLC

(57) ABSTRACT

An air cooled resistor arrangement comprising a first elongated tube member forming a first air flow channel and a second elongated tube member forming a second air flow channel, wherein the first elongated tube member is at least partly housed inside the second elongated tube member. The air-cooled resistor arrangement further comprises an air dilution portion comprising at least one opening at which the first air flow channel is arranged in fluid communication with the second air flow channel.

15 Claims, 5 Drawing Sheets

AIR-COOLED RESISTOR ARRANGEMENT

RELATED APPLICATIONS

The present application claims priority to European Patent Application No. 22163272.2, filed on Mar. 21, 2022, and entitled "AIR COOLED RESISTOR ARRANGEMENT," which is incorporated herein by reference in its entirety.

TECHNICAL FIELD

The present invention relates to an air-cooled resistor arrangement. The air-cooled resistor is advantageously incorporated into a vehicle and configured to dissipate electric power generated by an electric traction motor. The present invention also relates to a braking system and a vehicle comprising such an air-cooled resistor arrangement. Although the invention will mainly be directed to a vehicle in the form of a truck using an electric traction motor propelling the vehicle, the invention may also be applicable for other types of vehicles at least partially propelled by an electric traction motor, such as e.g., an electric vehicle, a hybrid vehicle comprising an electric machine as well as an internal combustion engine for propulsion.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy-duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder, etc. However, for an electric vehicle, the auxiliary braking functionality can be a dimensioning factor for the cooling system since the cooling capacity of e.g., a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide a means for improving the dissipation of electric power when e.g., the vehicle battery is fully charged, i.e., when the so-called state-of-charge level is above a predetermined threshold limit.

SUMMARY

It is thus an object of the present invention to at least partially overcome the above-described deficiencies.

According to a first aspect, there is provided an air cooled resistor arrangement, comprising an inlet configured to receive a flow of air, and an outlet configured to convey the flow of air out from the resistor arrangement, a first elongated tube member forming a first air flow channel configured to convey a first air flow portion from the inlet towards the outlet, the first elongated tube member extends between the inlet and the outlet, a second elongated tube member extending between the inlet and the outlet, wherein the first elongated tube member is at least partly housed by the second elongated tube member, the first and second elongated tube members being spaced apart from each other to form a second air flow channel configured to convey a second air flow portion from the inlet, and an electrically conductive resistor element comprising an electric resistive material connectable to a source of electric power, the resistor element being arranged inside the first elongated tube member, wherein the air cooled resistor arrangement further comprises an air dilution portion comprising at least one opening at which the first air flow channel is arranged in fluid communication with the second air flow channel, the air dilution portion being arranged at a position between the inlet and the outlet.

The wording "tube member" should, if not explicitly referred to as otherwise, be construed as an elongated member which is open at its axial ends. The elongated member can have any suitable cross-sectional shape, such as e.g., a circular shape, the shape of a cylindric cylinder, an oval shape, a rectangular shape, etc.

Further, the electric resistive material, which may also be referred to as an electric resistance material, should be construed as a material which can resist the conduction of electric current, i.e., it has the ability to resist electric power. When receiving electric power, heat is generated in the electric resistive material. The electric resistive material may e.g., be manufactured from ceramic materials, metal, metal alloys, etc. As is well known, the electrical resistivity of a material is different depending on the specific type of material used. The specific type of material used for the present invention is thus dependent on e.g., the application of use and the availability of such material. To put it differently, the skilled person can use the type of material that suits the application of use best.

Moreover, the wording "at least partly housed" should be construed such that the first elongated tube member is completely housed inside the second elongated tube member along the full extension of the first elongated tube member. As an alternative, the first elongated tube member may protrude axially from the second elongated tube member at the inlet and/or the outlet. As a still further conceivable alternative, the first and second elongated tube members may be formed in a rectangular cross section, wherein the second elongated tube member may be formed by two or more elongated tube members with rectangular cross section. In such a case, the two or more elongated tube members may be arranged along an extension of the first rectangular elongated tube member. Hence, the second elongated tube member is in such example not fully surrounding the first elongated tube member, but at least partly housing the first elongated tube member.

The inventors of the present disclosure have realised that the temperature level of an air-cooled resistor arrangement will increase downstream the inlet receiving the flow of air. In detail, the temperature level of the flow of air will continuously increase in the direction from the inlet towards the outlet. Also, the cross-sectional flow area perpendicular to the flow direction along the first and second elongated tube members should preferably be small in comparison to the length of the longitudinal extension. Hereby, the air is able to flow through the first elongated tube member and the air gap at a relatively high air flow velocity. Thus, the air will flow a substantial distance within the air-cooled resistor arrangement. The air dilution portion hereby efficiently dilutes the warm air with colder air from the second air flow channel. Accordingly, a large heat transfer area is provided. The heat transfer area is provided with an efficient cooling capacity, i.e., a reduced risk of overheating the resistor arrangement is achieved. An additional advantage is that less heat insulation is needed since the resistor arrangement will not be too warm, i.e., radiate less heat to the ambient.

As described above, the cross-sectional flow area perpendicular to the flow direction along the first and second elongated tube members should preferably be small in comparison to the length of the longitudinal extension. In further detail, the length of the active resistor, i.e., the longitudinal direction should preferably be longer than the square root of the area forming the inlet of the first elongated tube member. According to a non-limiting example, if the area forming the inlet is 4 square decimetres, the longitudinal directional length should preferably be at least 2 decimetre. This may be applicable both for a cross-sectional area having a circular shape as well as a cross-sectional area having a rectangular shape. According to another non-limiting example, the longitudinal extension may be 1.5 times the square root of the area forming the inlet. Hence, the cross-sectional flow area perpendicular to the flow direction along the first and second elongated tube members is in these examples small in comparison to the length of the longitudinal extension.

According to an example embodiment, the air dilution portion may comprise a plurality of openings, each opening being arranged in an envelope surface of the first elongated tube member. Preferably, and according to an example embodiment, the plurality of openings may be distributed along an elongation of the first elongated tube member. The air in the first air flow channel can hereby be diluted with colder air from the second air flow channel at various portions along the elongation of the first elongated tube member.

According to an example embodiment, an opening area of the plurality of openings may be increased along the elongation of the first elongated tube member in a direction towards the outlet.

Since the temperature is higher further away from the inlet, increasing the opening area for the openings further away from the inlet may provide for a substantially uniform temperature level of the air-cooled resistor arrangement along the elongation of the first elongated tube member. The opening area may hence be sequentially larger in the direction away from the inlet.

According to an example embodiment, the air dilution portion may comprise a valve for controllably arrange the first air flow channel in fluid communication with the second air flow channel. Hereby, the dilution of air can be controlled depending on an operational mode, such as e.g., the pressure level within the air-cooled resistor, etc. Also, if there is a desire to exhaust higher air temperature for heating an auxiliary component of the vehicle, some of the valves, or all valves can be kept closed during a predetermined time period.

According to an example embodiment, the air dilution portion may comprise a baffle configured to control a flow direction of the second air flow portion into the first air flow channel. Hereby, the direction of the air flow can be efficiently controlled.

According to an example embodiment, the electrically conductive resistor element may comprise at least one connector element connectable to the source of electric power, the at least one connector element being arranged in the second air flow channel. Hereby, the risk of overheating the connector element is reduced since the connector element is arranged in the cooler second air flow channel. A reduced risk of short circuiting the electrically conductive resistor element is also hereby provided.

According to an example embodiment, the at least one connector may extend from the second air flow channel into the first air flow channel through the at least one opening. The opening hereby constitutes the air dilution portion.

According to an example embodiment, the air-cooled resistor arrangement may further comprise a third elongated tube member forming a third air flow channel, the third elongated tube member being at least partly housed by the first elongated tube member. According to an example embodiment, the third elongated tube may comprise at least one aperture at which the third air flow channel is arranged in fluid communication with the first air flow channel.

Hereby, the air in the first air flow channel can be diluted with air from both the second air flow channel as well as with air from the third air flow channel. The apertures of the third elongated tube may be arranged at different longitudinal positions compared to the longitudinal position of the air dilution portion of the first elongated tube member. Preferably, and according to an example embodiment, the at least one aperture may be arranged on an envelope surface of the third elongated tube.

According to an example embodiment, the second elongated tube member may be closed in a direction perpendicular to its elongation along the extension between the inlet and the outlet. The second elongated tube member can hereby prevent the heat from the electrically conductive resistor element to reach the ambient environment. An advantage is thus that the second elongated tube member can form a heat shield to its ambient environment. This is particularly advantageous as the air-cooled resistor can be positioned in the vicinity of components which are less heat resistant.

According to an example embodiment, the electrically conductive resistor element may extend between the inlet and the outlet. Hereby, the air directed through the first elongated tube member cools the electrically conductive resistor element throughout the entire travel along the elongated tube members.

According to an example embodiment, the second elongated tube member may be circular in cross section. A circular cross section is particularly advantageous as it can sustain an air flow of relatively high pressure. The air-cooled resistor arrangement can thus, for example, be arranged downstream an air compressor generating a flow of high pressurized air directed into the air-cooled resistor.

According to a second aspect, there is provided a braking system for a vehicle, comprising an electric traction motor configured to propel the vehicle during propulsion and to controllably generate electric power during braking, an air blower arranged in an air conduit, an air cooled resistor arrangement according to any one of the embodiments described above in relation to the first aspect, the air cooled resistor arrangement being arranged in the air conduit in downstream fluid communication with the air blower, and a source of electric power electrically connected to the electric machine and to the electrically conductive resistor element of the air cooled resistor, the source of electric power comprising an electric storage system configured to receive and supply electric power, wherein the air cooled resistor arrangement is operated by electric power received from the electric power system, the electric power system being further electrically connected to the electric traction motor and configured to receive electric power generated by the electric traction motor during braking.

The electric traction motor is thus arranged to generate electric power during braking. It should however be observed that during braking, the generated electric power does not necessarily have be fed to a vehicle battery. The electric power generated during braking can instead be fed to the air-cooled resistor, whereby the air-cooled resistor dissipates the electric power generated by the electric traction motor. This may be particularly applicable when e.g., the state-of-charge level of the battery is above a predetermined threshold limit, or when the electric power absorption capability of the battery is below a predetermined threshold.

Moreover, the air blower should be construed as an arrangement which is configured to convey air towards the air-cooled resistor arrangement. The air blower preferably pressurizes the air. The air blower may be a fan or an air compressor. An air compressor may be operated in a number of manners. For example, the air compressor may be an electric air compressor operated by electric power received from e.g., the below described electric power system. As will also be described below, the air compressor may be operated by an electric machine. In this example, the air compressor is mechanically connected to the electric machine via e.g., a shaft. The electric machine is in turn preferably operated by electric power received from the electric power system. As a further example, the air compressor may be a mechanically operated air compressor. In such a case, the air compressor is preferably connected to a rotating shaft for its operation. The rotating shaft may, for example, be a shaft of an electric traction motor propelling the wheels of the vehicle. The air compressor may in such case be connected to the shaft via a clutch for controlling operation of the air compressor.

The braking system can thus be advantageously operated for dissipating surplus electric power generated by the electric traction motor.

Further effects and features of the second aspect are largely analogous to those described above in relation to the first aspect.

According to a third aspect, there is provided a vehicle, comprising an electric traction motor configured to propel the vehicle, a source of electric power comprising an electric storage system, wherein the source of electric power is electrically connected to the electric traction motor, and an air cooled resistor arrangement according to any one of the embodiments described above in relation to the first aspect, wherein the electrically conductive resistor element is electrically connected to the source of electric power for dissipating electric power generated by the electric traction motor during braking.

Effects and features of the third aspect are largely analogous to those described above in relation to the first and second aspects.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
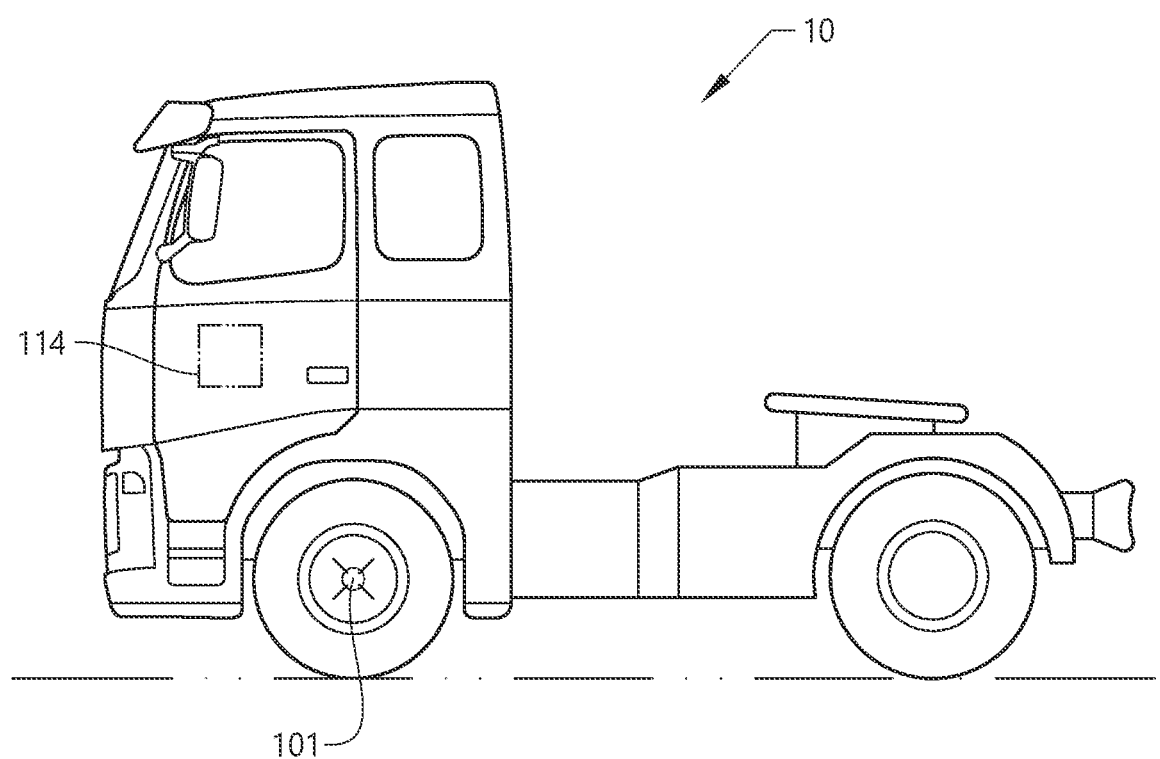
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is depicted a vehicle 10 in the form of a truck. The vehicle comprises a traction motor 101 for propelling the wheels of the vehicle. In FIG. 1, the truck is depicted as being front wheel driven but is should be readily understood that the invention is equally applicable for a rear wheel driven truck, or a four-wheel driven truck, etc. The traction motor 101 is in the example embodiment an electric traction motor 101 in the form of an electric machine, which is arranged to receive electric power from a source of electric power (104 in FIG. 2), which may be e.g., an electric power system and/or a fuel cell system. The source of electric power may also in the following be referred to as an electric power system 104. The vehicle 10 also comprises a control unit 114 for controlling various operations as will also be described in further detail below, and a braking system (not shown in detail in FIG. 1) operable to perform an auxiliary braking action for the vehicle 10.

The control unit 114 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device.

Figure 2:
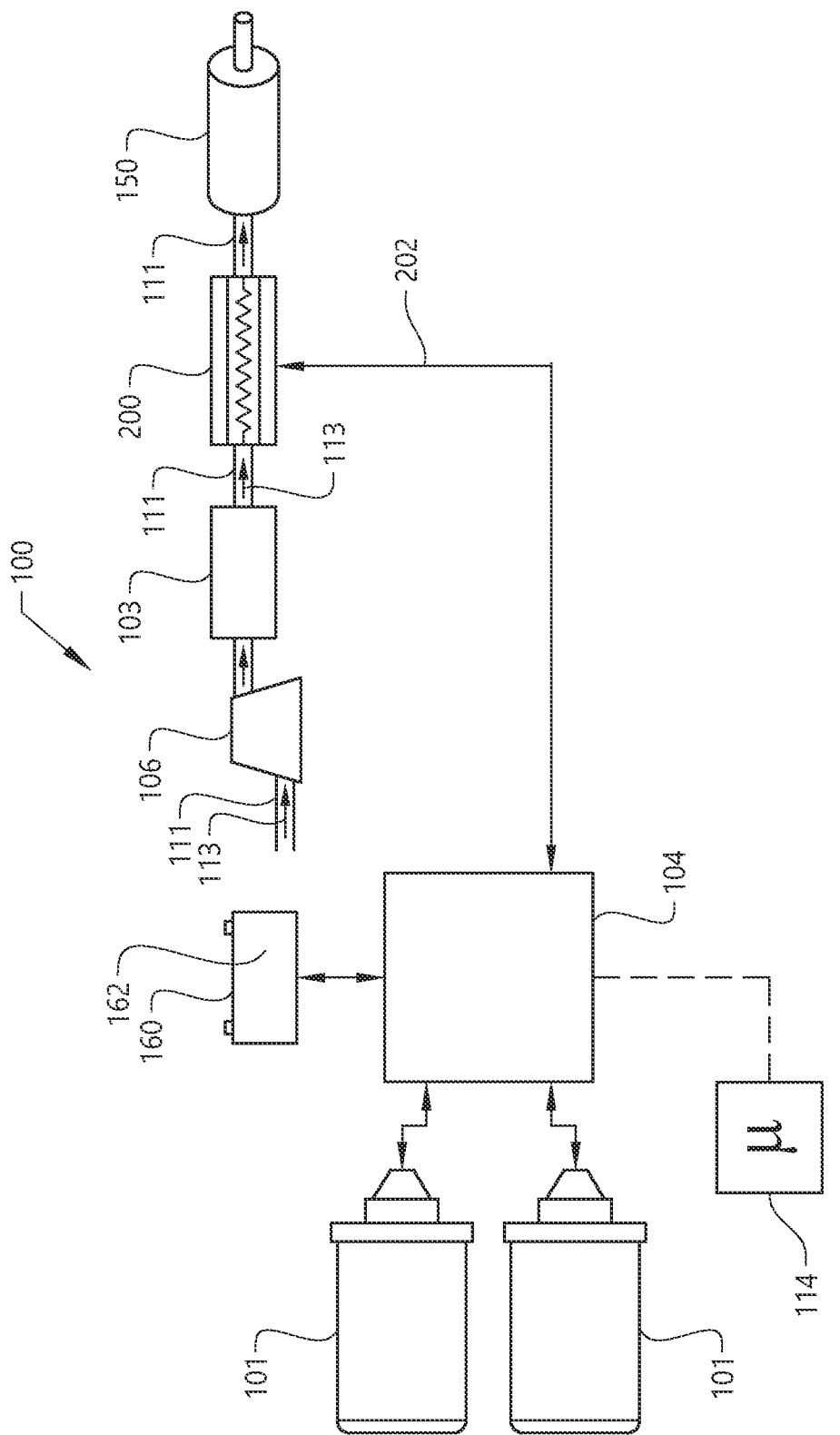
FIG. 2 is a schematic illustration of a braking system according to an example embodiment.

In order to describe the braking system 100 in further detail, reference is made to FIG. 2 which is a schematic illustration of a braking system according to an example embodiment. As can be seen in FIG. 2, the braking system 100 comprises an electric traction motor 101, in FIG. 2 illustrated as a pair of electric traction motors 101. The braking system 100 further comprises an electric power system 104 which is connected to the electric traction motor(s) 101 for supply of electric power to the electric traction motor(s) 101 when the electric traction motor(s) 101 is/are propelling vehicle 10, and to receive electric power from the electric traction motor(s) 101 when the electric traction motor(s) 101 generates electric power during braking. Thus, the braking system 100 can be referred to as an auxiliary braking system 100.

The source of electric power 104 further comprises an electric storage system 160. The electric storage system 160 is preferably arranged in the form of a vehicle battery and will in the following be referred to as a battery 162. The battery 162 is configured to receive electric power generated by the electric traction motor(s) 101 when the electric traction motor(s) 101 generates electric power during braking, i.e., operates in a regenerative braking mode. The battery 162 is also arranged to supply electric power to the electric traction motor(s) 101 when the electric traction motor(s) 101 propel the vehicle 10. Although not depicted in FIG. 2, the source of electric power may comprise various components, such as traction inverters, brake inverters, a junction box, etc.

The above-described control unit 114 is connected to the source of electric power 104. The control unit 114 comprises control circuitry for controlling operation of the electric power system. The control unit 114 thus receives data from the source of electric power 104, such as e.g., a state-of-charge (SOC) of the battery 162, etc, and transmits control signals to the source of electric power 104. As will be evident from the below disclosure, the control signals from the control unit 114 to the source of electric power 104 may, for example, comprise instructions to which device the source of electric power 104 should supply electric power during regenerative braking.

The braking system 100 also comprises an air blower 106. The air blower 106 is preferably an air compressor 106 and will in the following be referred to as such. The air compressor 106 is arranged in an air conduit 111 and configured to receive air 113. The received air 113 is pressurized by the air compressor 106 and supplied further through the air conduit 111 downstream the air compressor 106. The air compressor 106 may be connected to, and operable by, an electric traction motor shaft (not shown) of one of the electric traction motors 101. The air compressor 106 is in such case a mechanically operated air compressor. During e.g., braking, the air compressor is controllably connected to the electric traction motor shaft and acts as an inertia, which reduces the level of electric power generated by the electric traction motor. The air compressor also dissipates power by pressurizing air, thereby reducing the level of electric power generated by the electric traction motor. The air compressor 106 may, as an alternative be connected to, and operated by an electric machine (not shown). The air compressor 106 is in such case mechanically connected to such electric machine by an output shaft of the electric machine. The electric machine is hence a different electric machine compared to the electric traction motors, i.e., not arranged to generate a propulsion torque on the wheels of the vehicle. The electric machine is thus connected to the source of electric power 104, whereby surplus electric power generated by the electric traction motor(s) can be fed to the electric machine for electric dissipation, i.e., the electric machine in combination with the air compressor is arranged as a power consumer.

According to the non-limiting exemplified embodiment in FIG. 2, the braking system 100 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. The braking system 100 also comprises an air-cooled resistor arrangement 200 in the air conduit 111.

The air-cooled resistor arrangement 200 is arranged in the air conduit 111 in downstream fluid communication with the air compressor 106. The air-cooled resistor arrangement 200 is electrically connected to, and operable by, the source of electric power 104. In particular, the air-cooled resistor arrangement 200 is electrically connected to the source of electric power 104 by means of electric wire cabling 202 where, as can be seen in e.g., FIG. 5, an electrically conductive resistor element of the air cooled resistor arrangement 200 comprises a connector element for connecting to the electric wire cabling 202. Thus, also the air-cooled resistor arrangement 200 is arranged as an electric power consumer. When the air-cooled resistor arrangement 200 receives electric power from the source of electric power 104, the pressurized air 113 from the air compressor is heated by the air-cooled resistor arrangement 200, which is described in further detail below with reference to FIGS. 3-5. The pressurized and heated air is thereafter directed towards the ambient environment or other components in need of thermal management. The air from the air-cooled resistor arrangement 200 is preferably directed into a muffler 150 of the braking system 100. The muffler 150 reduces noise and can also provide a pressure drop of the air.

Although not depicted in FIG. 2, it should be readily understood that the control unit 114 can be connected to other components in addition to the connection to the source of electric power 104. For example, the control unit 114 may be connected to the electric traction motor(s) 101, the battery 162, the air-cooled resistor arrangement 200, as well as connected to an upper layer vehicle control system (not shown).

During operation of the braking system 100, i.e., when the electric traction motor 101 operates as generators to control the vehicle speed, i.e., the vehicle 10 operates in a braking mode, electric power is transmitted from the electric traction motor 101 to the source of electric power 104. If the battery 162 is not able to receive all, or parts of the electric power generated by the electric traction motor 101, for example because of the current electric charging capacity, i.e., the level of electric power the battery is able to receive until being fully charged, has been reached, the excess electric power should preferably be dissipated. In the present case, the source of electric power 104 can be controlled to feed electric power to the air-cooled resistor arrangement 200.

Accordingly, the control circuitry of the control unit 114 determines a level of electric power dissipation for the source of electric power 104, i.e., a level of electric power that should be dissipated since it is not suitable to supply such power to the battery 162. The level of electric power dissipation is hence a difference between the level of electric power generated during the braking and the current electric charging capacity of the battery 162.

Figure 3:
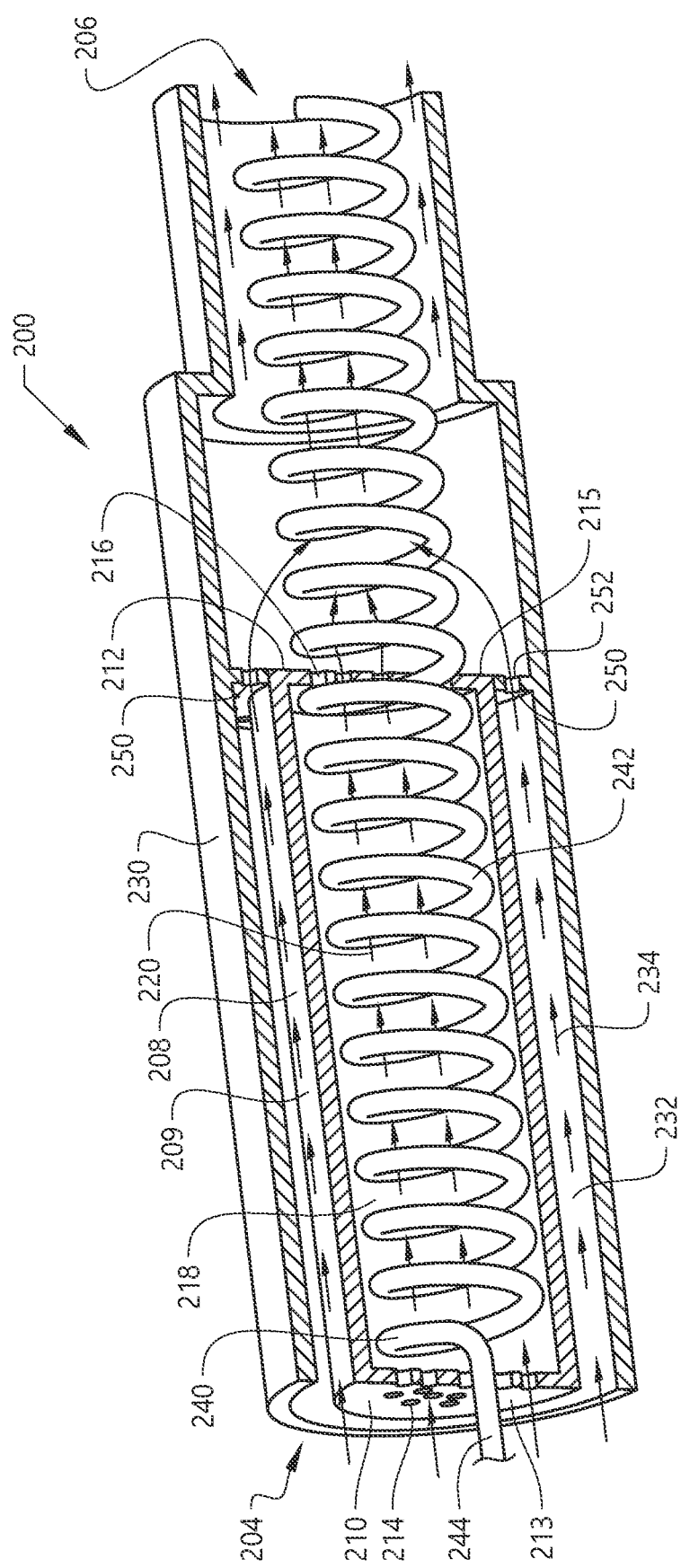
FIG. 3 is a schematic illustration of an air-cooled resistor arrangement according to an example embodiment.

In order to describe the air-cooled resistor arrangement in further detail, reference is now made to FIG. 3, which is a perspective view schematically illustrating the air-cooled resistor arrangement according to an example embodiment. The air-cooled resistor arrangement 200, also merely referred to as the resistor arrangement, comprises an inlet 204 configured to receive a flow of air, and an outlet 206 configured to convey the flow of air out from the resistor arrangement 200. In further detail, and with reference to FIG. 2, the inlet 204 preferably receives pressurized air generated by the air compressor 106.

The resistor arrangement 200 comprises a first elongated tube member 208. In the example embodiment depicted in FIG. 3, the first elongated tube member 208 extends from the inlet 204 in a direction towards the outlet 206. The first elongated tube member 208 thus extends between a first tube inlet end 210 and a first tube outlet end 212. As exemplified, the first tube inlet end 210 may comprise a plate 213 with inlet openings 214 for receiving the air fed from the air compressor 106. In a similar vein, the first tube outlet end 212 may comprise a plate 215 with outlet openings for directing the air from the first elongated tube member 208.

The first elongated tube member thus forms a first air flow channel 218 conveying a first air flow portion 220 from the inlet towards the outlet 206.

The resistor arrangement 200 also comprises a second elongated tube member 230 extending between the inlet 204 and the outlet 206. As can be seen in FIG. 3, the first elongated tube member is housed by the second elongated tube member 230 along the extension of the first elongated tube member 208. The first 208 and second 230 elongated tube members are in the exemplified embodiment of a circular cross-section and have an axial extension. The first 208 and second 230 elongated tube members are spaced apart from each other in a radial direction, thereby forming a second air flow channel 232. The second air flow channel 232 hereby conveys a second air flow portion 234 from the inlet 204 towards the outlet 206.

As further depicted in FIG. 3, the resistor arrangement 200 comprises an electrically conductive resistor element 240. The electrically conductive resistor element 240 comprises an electric resistive material 242 connectable to the source of electric power (104 in FIG. 2). The resistor element 240 is arranged inside the first elongated tube member 208 and comprises a connector element 244 connected to the source of electric power 104 via the electric wire cabling 202 illustrated in FIG. 2.

Moreover, the resistor arrangement further comprises an air dilution portion 250 arranged at a position between the inlet 204 and the outlet 206. The air dilution portion 250 comprises at least one opening 252. At the at least one opening 252, the first 218 and second 232 air flow channels are arranged in fluid communication with each other. Hereby, and as illustrated in FIG. 3, the first air flow portion 220 and the second air flow portion 234 are mixed with each other at a position downstream the air dilution portion 250. Since the electrically conductive resistor element 240 is arranged inside the first elongated tube member 208, i.e., in the first air flow channel 218, the first air flow portion 220 is heated when travelling through the first elongated tube member 208. The first air flow portion 220 is thus diluted with the lower temperature second air flow portion 234 downstream the air dilution portion 250. Diluting the first air flow portion 220 with the second air flow portion 234 can hereby reduce the temperature of the electrically conductive resistor element 240. The air dilution portion 250 may also comprise a plurality of openings arranged in the envelope surface 209 of the first elongated tube member 208 as will be evident from the description of FIG. 4 below.

Furthermore, the second elongated tube member 230 is closed in a direction perpendicular to its elongation along the extension between the inlet 204 and the outlet 206. Hence, the second elongated tube member 230 is forming a heat shield towards its environment. Also, and as depicted in FIG. 3, the electrically conductive resistor element 240 preferably extends between the inlet 204 and the outlet 206.

Figure 4:
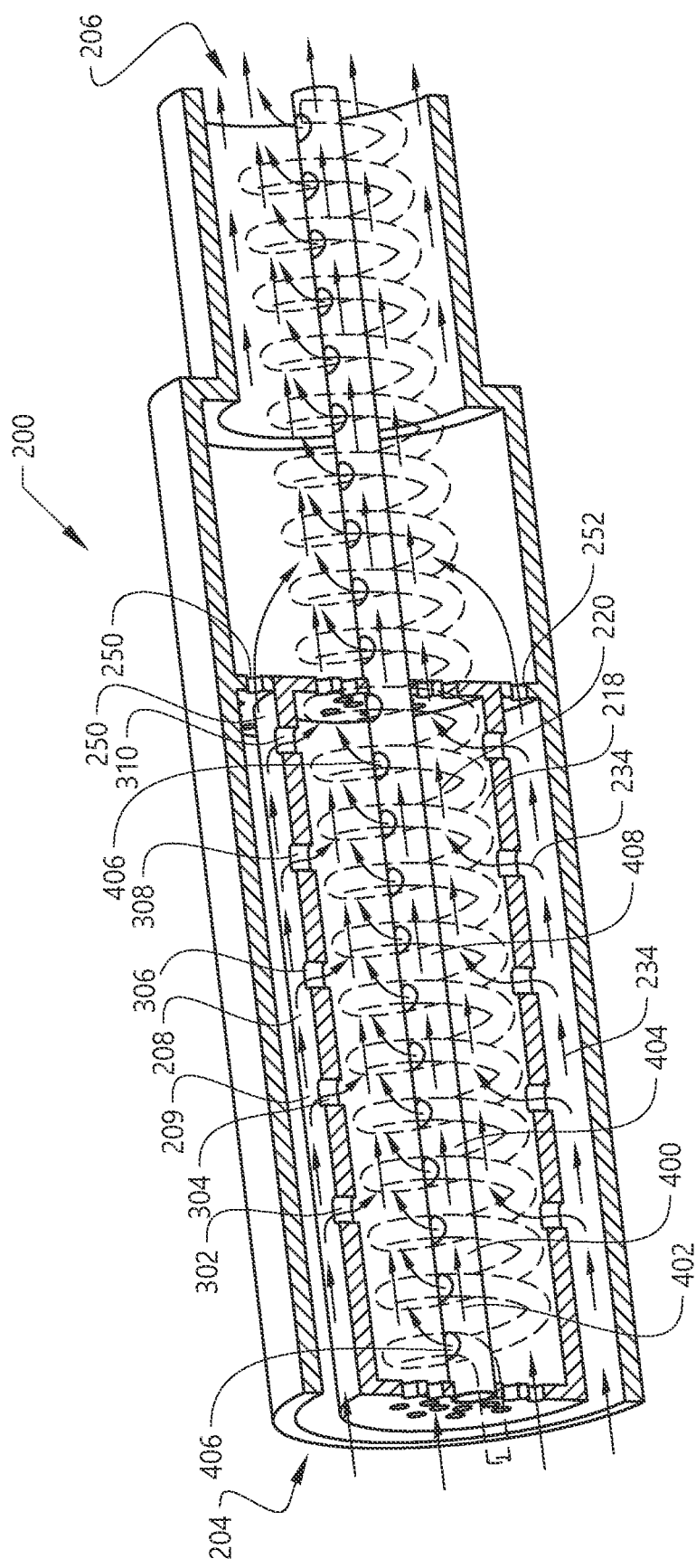
FIG. 4 is a schematic illustration of an air-cooled resistor arrangement according to another example embodiment.

In order to describe the resistor arrangement 200 according to another example embodiment, reference is now made to FIG. 4. The example embodiment depicted in FIG. 4 comprises the same features described above in relation to FIG. 3. These features will not be described in further detail below. Hence, the following description in relation to FIG. 4 will focus on the description of additional features of the resistor arrangement 200 compared to the resistor arrangement 200 in FIG. 3.

As can be seen in FIG. 4, and as briefly indicated above, the air dilution portion 250 comprises a plurality of openings 302, 304, 306, 308, 310 arranged in the envelope surface 209 of the first elongated tube member 208. As can be seen in FIG. 4, the openings 302, 304, 306, 308, 310 on the envelope surface 209 are distributed along the elongation of the first elongated tube member 208. According to an example, although not explicitly depicted in FIG. 4, an opening area, i.e., a cross-sectional area of the openings 302, 304, 306, 308, 310 may be increased along the elongation of the first elongated tube member 208 in the direction towards the outlet 206. In further detail, the opening area of the openings 302, 304, 306, 308, 310 can be successively increased towards the outlet. Hence, the opening area of the opening 310 located closest to the outlet 206 is larger compared to the opening area of the opening 302 located closest to the inlet 204.

The plurality of openings 302, 304, 306, 308, 310 on the envelope surface 209 hereby enables for a dilution of the first air flow portion 220 with the second air flow portion 234 along the elongation of the first elongated tube member 208. It should be understood, although not depicted in the figures, that the air dilution portion 250 may comprise a valve or a baffle. Such valve and/or baffle may thus be arranged at one or more of the openings 252, 302, 304, 306, 308, 310 forming part of the air dilution portion 250.

The resistor arrangement 200 in FIG. 4 also comprises a third elongated tube member 400. The third elongated tube member 400 is arranged inside the first elongated tube member 208, i.e., the third elongated tube member 400 is at least partly housed by the first elongated tube member 208. As can be seen in FIG. 4, the third elongated tube member 400 comprises a first portion housed by the first elongated tube member 208, and a second portion extending from the first elongated tube member 208 towards the outlet 206. The third elongated tube member 400 receives a third air flow portion 402 and forms a third air flow channel 404 into which the third air flow portion 402 is conveyed from the inlet 204 towards the outlet 206.

Moreover, the third elongated tube member 400 comprises at least one aperture 406. In FIG. 4, the third elongated tube member 400 comprises a plurality of apertures 406. The apertures 406 are arranged on an envelope surface 408 of the third elongated tube member 400. Hereby, the third air flow channel 404 is arranged in fluid communication with the first air flow channel 218 via the apertures 406.

By means of the apertures 406, the air flow portion 220 in the first air flow channel 218 is diluted with air also from the third air flow channel 404, i.e., diluted with the third air flow portion 402.

Figure 5:
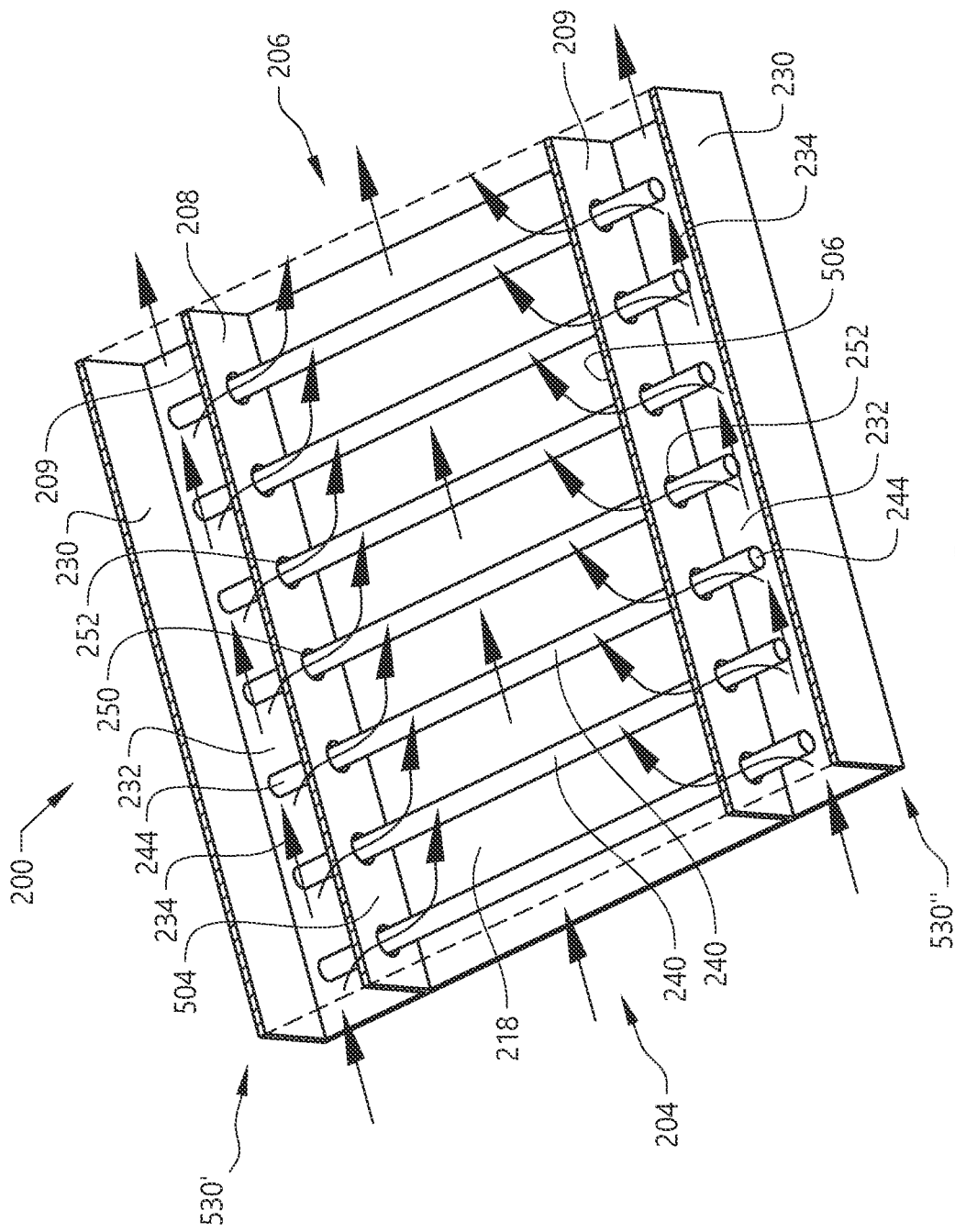
FIG. 5 is a schematic illustration of an air-cooled resistor arrangement according to yet another example embodiment.

In order to describe the resistor arrangement according to a still further example embodiment, reference is now made to FIG. 5. FIG. 5 is a cross-sectional perspective view of the resistor arrangement 200. According to the example embodiment depicted in FIG. 5, the first elongated tube member 208 comprises a rectangular cross-section and forms a first air flow portion 218 between the inlet 204 and the outlet 206. The second elongated tube member 230 is formed by two elongated tube members 530', 530" with rectangular cross-section, where a first one 530' of the two elongated tube members extends along a first side wall 504 of the first elongated tube member 208, and a second one 530" of the two elongated tube members extends along a second side wall of the first elongated tube member 208. The first 504 and second 506 side walls are exemplified as located opposite to each other as seen along the flow direction of air. The two elongated tube members 530', 530" hereby at least partly house the first elongated tube member 208.

The air dilution portion 250 comprises, in a similar vein as the embodiments described above in relation to FIGS. 3 and 4, at least one opening 252. In FIG. 5, the air dilution portion 250 comprises a plurality of openings 252 on the envelope surface 209 of the first elongated tube member 208. Thus, first 218 and second 232 air flow channels are arranged in fluid communication with each other via the air dilution portion 250, i.e., via the openings 252.

In a similar vein as the embodiments of FIGS. 3 and 4, the resistor arrangement 200 also comprises the electrically conductive resistor element 240 arranged in the first elongated tube member 208. The electrically conductive resistor element 240 comprises, as also described above, at least one connector element 244 connected to the source of electric power (104 in FIG. 2) via the electric wire cabling 202 depicted in FIG. 2. As illustrated in FIG. 5, the connector element 244 is arranged in the second air flow channel 232. The connector element 244 is hereby arranged to receive the second air flow portion 234, whereby the temperature level of the connector element can be efficiently reduced by the relatively low temperature second air flow portion 234. As can be seen in FIG. 5, the connector element 244 extends though the opening 252 and into the first air flow channel 218.

It is to be understood that the present disclosure is not limited to the embodiments described above and illustrated in the drawings; rather, the skilled person will recognize that many changes and modifications may be made within the scope of the appended claims. For example, it should be understood that the second air flow channel 232 depicted in FIG. 5 may be closed at its outlet. Thus, the second air flow portion 234 is in such a case directed out from the air-cooled resistor arrangement 200 together with the first air flow portion. In further detail, all of the air in the second air flow channel is diluting the air in the first air flow channel.

The invention claimed is:

1. An air-cooled resistor arrangement, comprising:
an inlet configured to receive a flow of air, and an outlet configured to convey the flow of air out from the resistor arrangement,
a first elongated tube member forming a first air flow channel configured to convey a first air flow portion from the inlet towards the outlet, the first elongated tube member extending between the inlet and the outlet,
a second elongated tube member extending between the inlet and the outlet, wherein the first elongated tube member is at least partly housed by the second elongated tube member, the first and the second elongated tube members being spaced apart from each other to form a second air flow channel configured to convey a second air flow portion from the inlet, and
an electrically conductive resistor element comprising an electric resistive material connectable to a source of electric power, the resistor element being arranged inside the first elongated tube member,
wherein the air-cooled resistor arrangement further comprises an air dilution portion comprising at least one opening at which the first air flow channel is arranged in fluid communication with the second air flow channel, the air dilution portion being arranged at a position between the inlet and the outlet.

2. The air-cooled resistor arrangement of claim 1, wherein the air dilution portion comprises a plurality of openings, each opening being arranged in an envelope surface of the first elongated tube member.

3. The air-cooled resistor arrangement of claim 2, wherein the plurality of openings is distributed along an elongation of the first elongated tube member.

4. The air-cooled resistor arrangement of claim 3, wherein an opening area of the plurality of openings is increased along the elongation of the first elongated tube member in a direction towards the outlet.

5. The air-cooled resistor arrangement of claim 1, wherein the air dilution portion comprises a valve for controllably arranging the first air flow channel in fluid communication with the second air flow channel.

6. The air-cooled resistor arrangement of claim 1, wherein the air dilution portion comprises a baffle configured to control a flow direction of the second air flow portion into the first air flow channel.

7. The air-cooled resistor arrangement of claim 1, wherein the electrically conductive resistor element comprises at least one connector element connectable to the source of electric power, the at least one connector element being arranged in the second air flow channel.

8. The air-cooled resistor arrangement of claim 7, wherein the at least one connector extends from the second air flow channel into the first air flow channel through the at least one opening.

9. The air-cooled resistor arrangement of claim 1, wherein the air-cooled resistor arrangement further comprises a third elongated tube member forming a third air flow channel, the third elongated tube member being at least partly housed by the first elongated tube member.

10. The air-cooled resistor arrangement of claim 9, wherein the third elongated tube member comprises at least one aperture at which the third air flow channel is arranged in fluid communication with the first air flow channel.

11. The air-cooled resistor arrangement of claim 10, wherein the at least one aperture is arranged on an envelope surface of the third elongated tube member.

12. The air-cooled resistor arrangement of claim 1, wherein the second elongated tube member is closed in a direction perpendicular to its elongation along the extension between the inlet and the outlet.

13. The air-cooled resistor arrangement of claim 1, wherein the electrically conductive resistor element extends between the inlet and the outlet.

14. A braking system for a vehicle, comprising:
an electric traction motor configured to propel the vehicle during propulsion and to controllably generate electric power during braking,
an air blower arranged in an air conduit,
the air-cooled resistor arrangement of claim 1, the air-cooled resistor arrangement being arranged in the air conduit in downstream fluid communication with the air blower, and
a source of electric power electrically connected to the electric machine and to the electrically conductive resistor element of the air cooled resistor, the source of electric power comprising an electric storage system configured to receive and supply electric power, wherein the air cooled resistor arrangement is operated by electric power received from the electric power system, the electric power system being further electrically connected to the electric traction motor and configured to receive electric power generated by the electric traction motor during braking.

15. A vehicle, comprising:
an electric traction motor configured to propel the vehicle,
a source of electric power comprising an electric storage system, wherein the source of electric power is electrically connected to the electric traction motor, and
the air-cooled resistor arrangement of claim 1, wherein the electrically conductive resistor element is electrically connected to the source of electric power for dissipating electric power generated by the electric traction motor during braking.

\* \* \* \* \*